No. 798,397. PATENTED AUG. 29, 1905.
F. C. DE REAMER.
SERVICE SWITCH.
APPLICATION FILED DEC. 19, 1904.
2 SHEETS—SHEET 1.
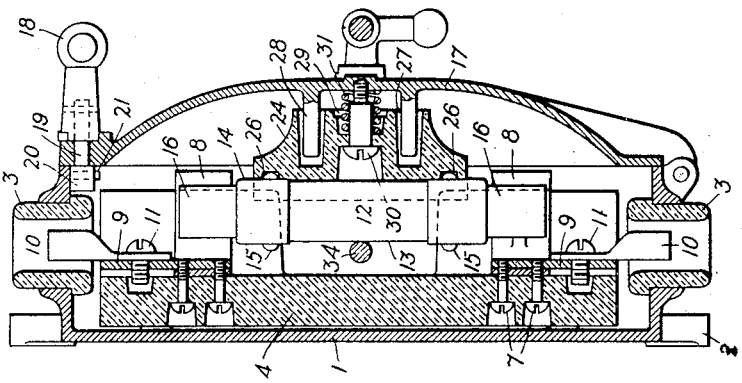
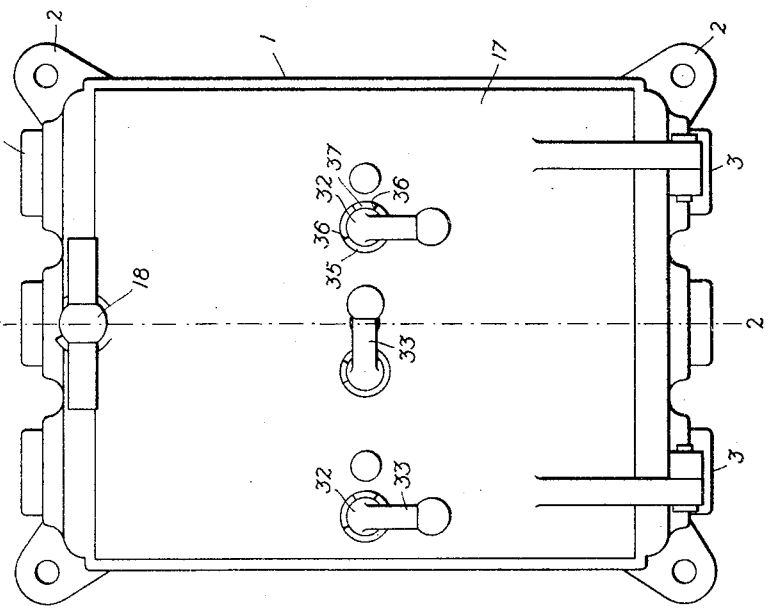
Witnesses.
Harry N. Tilden
Helen Oxford
Inventor.
Frank C. DeReamer.
by Allen B. Davis
Att'y.

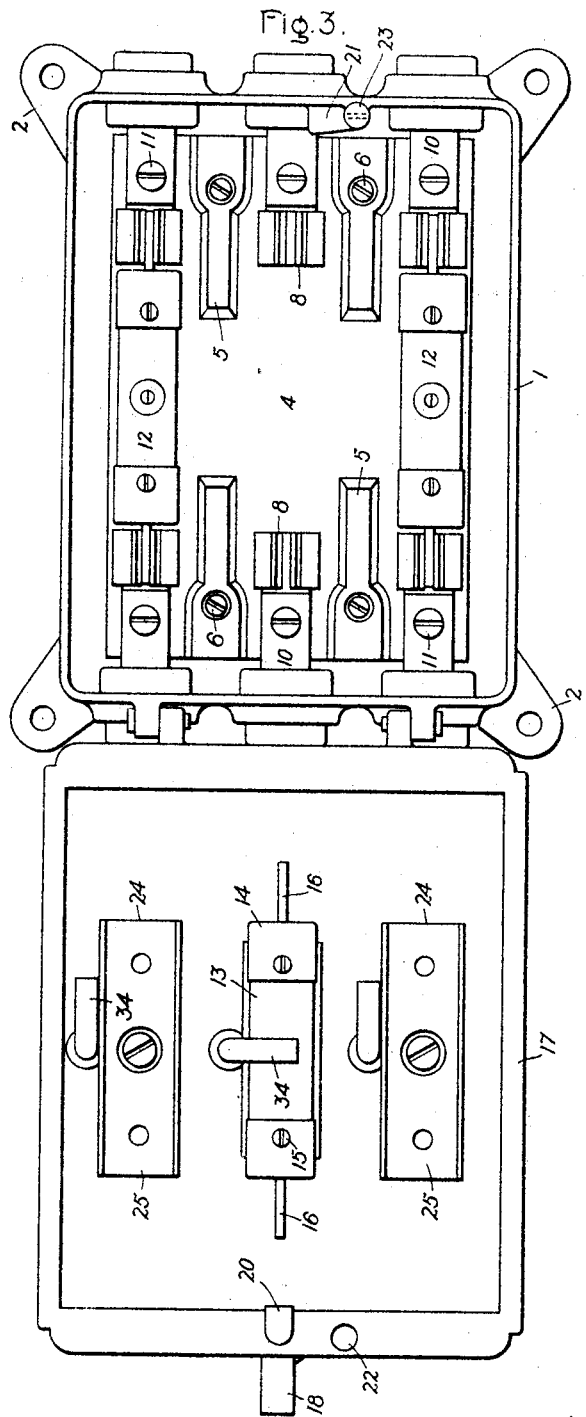

UNITED STATES PATENT OFFICE.

FRANK C. DE REAMER, OF SCHENECTADY, NEW YORK, ASSIGNOR TO GENERAL ELECTRIC COMPANY, A CORPORATION OF NEW YORK.

SERVICE-SWITCH.

No. 798,397.     Specification of Letters Patent.     Patented Aug. 29, 1905.

Application filed December 19, 1904. Serial No. 237,382.

*To all whom it may concern:*

Be it known that I, FRANK C. DE REAMER, a citizen of the United States, residing at Schenectady, county of Schenectady, State of New York, have invented certain new and useful Improvements in Service-Switches, of which the following is a specification.

The present invention relates to safety cut-out devices for electric circuits, and more particularly to that class of such devices commonly known as "service-switches," which are designed to be installed at or conveniently near the point of entrance of the circuit-conductors into a dwelling or other building and operate normally to protect the service of the dwelling or building from abnormal currents, and also as emergency devices, whereby the entire service system may be disconnected from the main distribution system, as in case of the dwelling or other building taking fire.

The object of my invention is to provide a strong and highly efficient device of this character which will consist of a few and simple parts and may be manufactured at low cost.

In carrying out my invention I provide a suitable box with insulated openings in opposite sides for the introduction of the ends of the branch feed-wires and the ends of the service-wires, and to the inner bottom thereof is secured an insulating-base, upon which are mounted pairs of metallic contact-clips corresponding to the number of wires in the system of distribution adapted to be electrically connected to the ends of the wires entering the box and to receive removably the end blades of inclosed thermal cut-outs or fuses of standard construction. The open side of the box is provided with a hinged cover adapted to be clamped and sealed in place to protect against meddling and has mounted thereon a number of fuse-clamping devices, whereby upon properly setting any one or several of the fuses may be withdrawn from the box upon opening of the cover without exposing the operator to danger of electric shocks, and when set in inoperative position the cover may be opened for purposes of inspection and reclosed without interference with the service. In order that the fuses may be flexibly supported when clamped to the cover, so that they may be individually self-adjusting as they are forced into their respective contact-clips, I provide spring-pressed blocks of insulation on the inner surface of the cover, which are held in proper positions by suitable guides and have their operating-faces grooved or recessed to provide good seating-surfaces for the fuses, so that each block and its respective fuse move in unison under the cushioning action of the spring as the end blades of the fuse are guided into place by the outer ends of the contact-clips. The means for locking the respective fuses to the cover consists of a corresponding number of fingers having operating-levers and extending through bearings in the cover and each provided at its inner end with a transverse projection which upon a partial rotation of the finger moves beneath the respective fuse and raises it slightly into firm engagement with its respective spring-pressed block.

For a more complete understanding of the invention reference may be had to the following detailed description and the accompanying drawings, forming a part of this specification, in which—

Figure 1 is a front elevation of a closed service-switch embodying my invention. Fig. 2 is a longitudinal section taken on line 2 2 of Fig. 1, and Fig. 3 is a front elevation of the switch with the cover thrown back with one of the fuses shown clamped thereto.

The box 1 is preferably made of cast-iron, with attaching-lugs 2 at each of the corners at the bottom, and has in each end a series of circular apertures provided with insulating-bushings 3 for the introduction to the inside of the box of the ends of the circuit-conductors. In the bottom of the box is an insulating-base 4, consisting of a flat slab of porcelain, with integral projections 5, which serve as barriers, and secured in place by screws 6, tapped into the bottom of the box. Secured to the front side of the base 4, near its opposite ends, by screws 7 are series of metallic contact-clips 8, with projections 9, to which terminal pieces 10 for the ends of the conductors are secured by binding-screws 11. Each pair of oppositely-disposed contact-clips 8 is adapted to receive and make electrical connection with an inclosed fuse 12 of standard construction, consisting of an insulating-tube 13, with end caps 14, secured thereto by round-headed screws 15 and contact-blades 16, projecting through the ends thereof.

The cover 17 is hinged to the lower end of the front side of the box and carries at its free end a rotary handle 18, having a spindle 19 extending through the cover and carrying at its end a locking-lug 20, adapted to be moved into locking position beneath a projection 21 on the box by a quarter-turn of the handle 18. The cover has near its upper edge at one side of the handle 18 an aperture 22, through which a short post 23, carried by the box, projects when the cover is closed, which is transversely apertured for the reception of the usual sealing-wire. On the inner surface of the cover are arranged directly above the fuses 12 a series of blocks 24, of insulating material, each provided on its fuse-engaging side with a grooved surface 25, adapted to provide a seat for its respective fuse, and at opposite ends thereof are formed small cavities 26 for the reception of the round screw-heads 15, whereby its fuse is positively centered with respect thereto. The opposite side of each block 24 is provided with two substantially cylindrical recesses 27 for the reception of corresponding guide-pins 28, rigidly fixed to the inner surface of the lid and operating to flexibly support the block in planes perpendicular to the cover while permitting resilient movement of the block toward and from the cover. The blocks 24 are each centrally pierced and oppositely countersunk at 29 for the reception of a screw 30, tapped into the cover and surrounded by a helical spring 31, which operates to yieldingly force the block away from the cover.

Extending through the cover adjacent to the side of each block 24 is a clamping-finger 32, having at its outer end an operating-arm 33 and at its inner end a bent projection 34, which when the finger is rotated into the position indicated at the middle of the cover in Fig. 3 extends across the under side of the insulating-tube 13 of the fuse and positively clamps it between itself and the respective block 24. The bearings for the fingers 32 are provided at their outer ends with segmental projections 35, with shouldered ends 36, which coöperate with corresponding radial projections 37 on the fingers to limit the extent of rotary movement of the fingers. By conventionally arranging the operating-arms 33 and the bent inner ends in planes at a definite angle, as indicated in the drawings, the arms 33 are rendered available as indicators of clamped and unclamped positions of the fingers.

I do not desire to restrict myself to the particular form or arrangement of parts herein described and shown, since it is apparent that they may be changed and modified without departing from my invention.

What I claim as new, and desire to secure by Letters Patent of the United States, is—

1. The combination with a box having insulated contact-clips mounted therein and adapted to receive a fuse, of a hinged member having a fuse-engaging part flexibly mounted thereon.

2. The combination with a box having insulated contact-clips mounted therein and adapted to receive a fuse, of a hinged member having a spring-pressed fuse-engaging part mounted thereon.

3. The combination with a box having insulated contact-clips mounted therein and adapted to receive a fuse, of a hinged member, a spring-pressed fuse-engaging part mounted thereon, and guides for said fuse-engaging part.

4. The combination with a box having insulated contact-clips mounted therein and adapted to receive a fuse, of a cover hinged to said box, a fuse-engaging block mounted on the inner side of said cover, a spring normally acting to force said block away from said cover, and guides for limiting transverse movement of said block.

5. The combination with a box having insulated contact-clips mounted therein for receiving contact-blades of a fuse, of a hinged member, a fuse-engaging block flexibly mounted thereon, and provided with fuse-centering means.

6. The combination with a box having insulated contact-clips mounted therein for receiving contact-blades of a fuse, of a cover hinged to said box and provided on its inner side with perpendicular guides, a fuse-engaging block mounted on said guides, a spring tending to force said block away from said cover, and recesses formed in the fuse-engaging surface of said block.

7. The combination of a box having insulated contact-clips mounted therein for receiving a fuse, of a hinged member provided with fuse-holding means comprising a flexibly-supported part, and a movable clamping part.

8. The combination of a box having insulated contact-clips mounted therein for receiving a fuse, of a hinged member provided with fuse-holding means comprising a spring-pressed block adapted to engage one side of the fuse, and a movable clamping part adapted to engage the opposite side of said fuse.

9. The combination of a box having insulated contact-clips mounted therein for receiving a fuse, a cover hinged to said box and provided with fuse-holding means comprising a flexible fuse-engaging part and a finger extending through the cover, and provided at its inner end with a fuse-engaging projection and at its outer end with a handle.

In witness whereof I have hereunto set my hand this 16th day of December, 1904.

FRANK C. DE REAMER.

Witnesses:
BENJAMIN B. HULL,
HELEN ORFORD.